Figure 10:
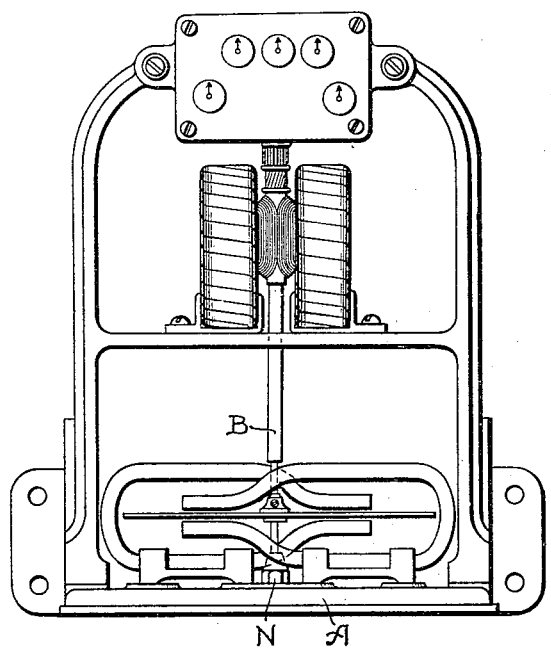

No. 733,611. PATENTED JULY 14, 1903.
G. H. ALTON.
BEARING FOR ELECTRIC METERS.
APPLICATION FILED NOV. 8, 1902.
NO MODEL. 2 SHEETS—SHEET 1.
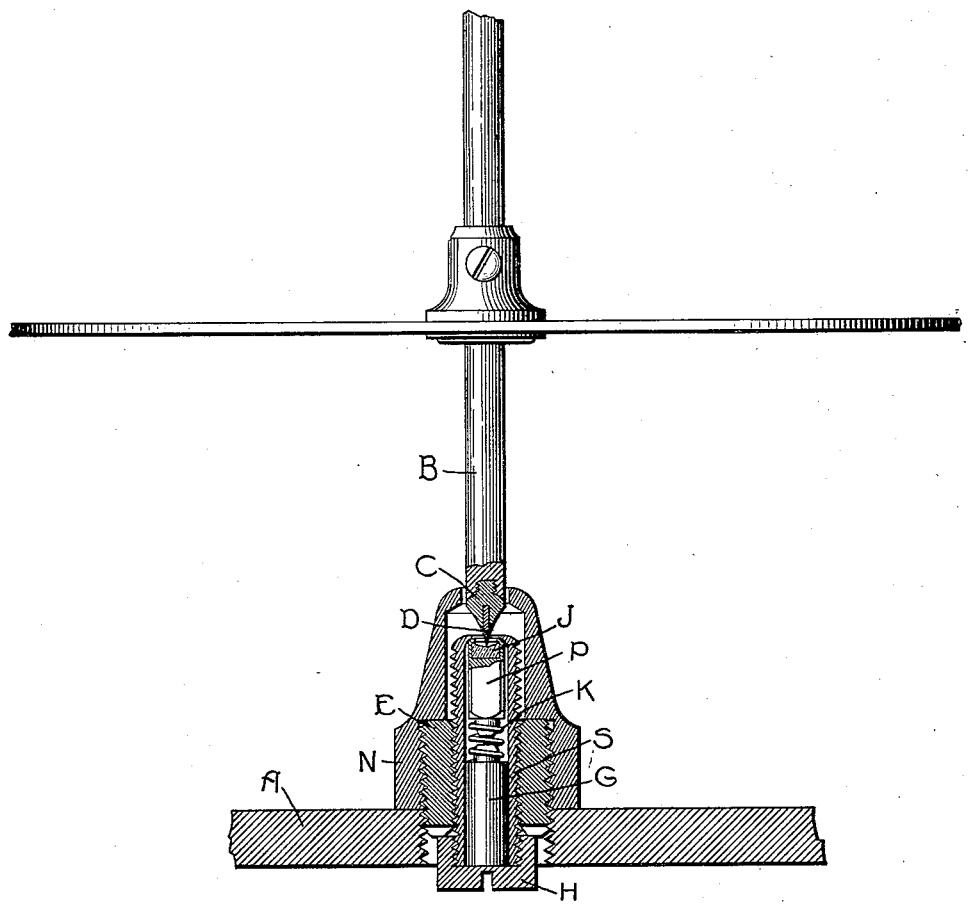
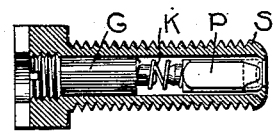
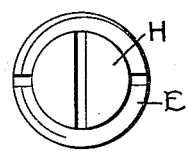
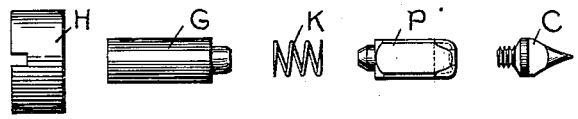
WITNESSES:
INVENTOR:
George H. Alton.
by Albert H. Davis
Atty No. 733,611. Patented July 14, 1903.

UNITED STATES PATENT OFFICE.

GEORGE H. ALTON, OF LYNN, MASSACHUSETTS, ASSIGNOR TO GENERAL ELECTRIC COMPANY, A CORPORATION OF NEW YORK.

BEARING FOR ELECTRIC METERS.

SPECIFICATION forming part of Letters Patent No. 733,611, dated July 14, 1903.

Application filed November 8, 1902. Serial No. 130,514. (No model.)

*To all whom it may concern:*

Be it known that I, GEORGE H. ALTON, a citizen of the United States, residing at Lynn, county of Essex, State of Massachusetts, have invented certain new and useful Improvements in Bearings for Electric Meters, of which the following is a specification.

This invention relates to a bearing for a vertical shaft, and particularly to that class known as "jewel-bearings" for electric-meter shafts, in which it is necessary to reduce the friction as much as is possible in order that the shaft will turn in response to the slightest increase or decrease of the energy or rotate at a rate exactly proportional to the energy that is being supplied.

The object of my invention is to provide a durable bearing in which there will be a minimum amount of friction, the parts of which can be adjusted and locked in any position and can be removed and replaced when they become worn.

As a means of reducing friction bearings have hitherto been constructed with the shaft tapered to a fine point, so that only this point bears upon the jewel commonly used as the bearing-block; but owing to the small mass of this point as compared with the mass of the shaft it has been difficult to get a satisfactory degree of hardness at the point, which on this account wears away quickly. In order to overcome this difficulty, I set a piece of hard-drawn steel or fine hard wire of the kind commonly known as "piano-wire" in the tapered end of the shaft to form the pivot on which the shaft revolves. These pivots can be tempered before being set in the shafts and because of their small mass can be made much harder than a tapered point on the shaft itself. Moreover, this pivot is drawn and of a fine grain, and therefore the bearing-surface can be brought to a much higher polish than would be possible if the shaft were tapered off to form the bearing. As the shaft of a meter often becomes magnetized, the pivot would stick to the shaft, rendering withdrawal difficult when the pivot becomes worn in order to replace it with a new one. I therefore set the pivot in a plug of non-magnetic material, such as brass, having a tapered end and screw this plug into the end of the shaft. Furthermore, I flatten a portion of the sides of this non-magnetic end piece or form a gripping-face thereon in some other manner, so that with a tool of small cross-section the end piece and the pivot inserted therein can be withdrawn through the bottom of the meter by only removing the jewel and the screw which supports it. In this way I am able to substitute a new pivot for one that is worn very quickly, as it is not necessary to open the casing of the meter.

After a meter has been in use some time the jewel becomes worn and rough and friction in the bearing increases accordingly. It is then necessary to put in a new jewel or repolish the old one. For this reason it is advantageous to so set the jewel that it can be easily removed. Jewels have commonly been set rigidly in the end of a screw or in a plug that rests on a spring within a hollow screw. In either of these cases it is necessary to destroy the screw to get the jewel out for repolishing. In my device I set the jewel in a plug or jewel-support that fits within a casing or carrier, preferably a hollow screw having a removable head, so that the jewel can be withdrawn by simply unscrewing the head and a plug containing a new jewel can be substituted while the old one is being repolished. I also provide for a clearance between the plug and its containing shell to prevent dust or dirt from collecting about the jewel. Directly under the jewel-plug and within the hollow screw I place a spiral spring which takes up any sudden jar and protects the jewel from damage.

In order to secure the proper adjustment of the bearing, the jewel is commonly mounted on a screw, as above indicated, so that the bearing can be raised or lowered to the position which allows the shaft to move most freely or to take the weight off the pivot in shipping; but I have found that in use the bearing of a meter frequently works up or down from the position of proper adjustment, and therefore I have provided means for locking the bearing in the desired position, thus obviating the necessity of frequent readjustment. I accomplish this by fitting the screw into an internally and externally threaded sleeve which is adjustable vertically in a threaded bore in the lower horizontal frame of the meter. This sleeve is turned in the bore until in such a position that when the head of the screw bears against its lower end the jewel-bearing is in the proper position. Threaded on the sleeve and above the frame is a locking-nut, which is adapted to be screwed down until its lower end bears against the frame of the meter. Thus movement of the screw is prevented by its head jamming against the sleeve and movement of the sleeve is prevented by the locking-nut jamming against the frame.

My invention therefore consists of improvements in the construction of bearings for measuring instruments, which will be more fully described hereinafter and definitely pointed out in the claims.

In the drawings, which are annexed hereto and which show an embodiment of my invention, Figure 1 is a cross-section of the bearing, and Fig. 2 an end view of the screw and sleeve. Fig. 3 shows the removable head of the screw which is shown in Fig. 8. Figs. 4, 5, and 6 show the plug, spring, and jewel-plug, respectively, that fit within the screw. Fig. 7 shows the removable end piece for the meter-shaft. Fig. 9 is a modification of the screw shown in Figs. 1, 3, and 8. Fig. 10 is an elevation of a meter of ordinary construction having the cover removed to show the shaft and bearing.

In Figs. 1 and 10 A represents the lower horizontal frame of the meter and B the vertical shaft. In the end of the shaft B is screwed the tapered end piece C, of brass or other non-magnetic material, also shown in Fig. 7, having a pivot D inserted lengthwise in its tapered end. This pivot is a piece of hardened steel or hard-drawn wire sharpened to a point and highly polished. The end piece C has a portion of its sides flattened, as shown in Fig. 7, so that it can be gripped and turned by a tool inserted through the sleeve E and the pivot thereby withdrawn from below the meter by merely removing the screw S. In the frame A is a threaded bore, into which is screwed a sleeve E, threaded on both its inner and outer sides. S is a hollow screw, Fig. 8, having a removable head H, Fig. 3, adapted to be screwed upward into the sleeve E. Within the hollow screw are the plug or jewel-support G, the spiral spring K, bearing on plug G, and the plug P, bearing on the spring K. These three parts are shown in Figs. 4, 5, and 6, respectively. In the plug P is set the jewel J, which forms the bearing-block for the pivot D, and this plug is provided with flattened surfaces with the corners rounded off, as shown in Fig. 6, so that any dust which may work into the screw S will fall down the opening between the inner side of the screw and the flattened sides of the plug. The length of the plug or spacer G governs the tension of the spring K, and both the spacer G and plug P have projections on their adjacent ends for centering the spring K, so as to prevent its ends from engaging the inside of the screw S, thus causing undue friction. The upper end of the screw S is turned in, so as to prevent the plug P from being pushed out at that end by the spring K when the screw is lowered. It will be seen that any jar that tends to throw the shaft down against the jewel is taken up by the spring K and the jewel is thereby protected from damage. On the sleeve E is the nut N, which is extended upward around the shaft B to protect the bearing from dust. Fig. 9 shows a modification of the screw, in which the head is not removable, but has a threaded bore of larger cross-section than the bore of the screw, and into this bore is screwed a threaded end of plug G to hold plug P and spring K in position.

Fig. 1 shows the jewel-bearing in the highest position, where it is locked by the head H of screw S jamming against sleeve E and movement of sleeve E prevented by the jamming of nut N against the frame A. If it is desired to lower the bearing, nut N is loosened to allow the sleeve to move. Screw S is then loosened and the sleeve E is turned a sufficient number of times to lower it the distance it is required to lower the bearing. In this position the nut N is screwed down onto the frame, thereby locking sleeve E against farther movement. The screw S can thus be turned in the sleeve until the head H jams against the sleeve again and the bearing is locked in the lower position. To raise the bearing, the nut N is first loosened and screw S is turned to raise the bearing the required distance. Its head being jammed against sleeve E, the sleeve will turn with it. When in the proper position, nut N is once more screwed down onto the frame A and the bearing is again locked. When the jewel becomes worn, screw S is taken out without loosening nut N and the plug P withdrawn by removing head H. A new jewel-plug is inserted, the head H put on again, and the screw returned to its position, with the head jammed against sleeve E.

What I claim as new, and desire to secure by Letters Patent of the United States, is—

1. In combination with the shaft of an electric measuring instrument, a removable end piece, and a piece of hardened steel inserted in the end of said end piece axially of the shaft.

2. In a measuring instrument, a shaft and an end piece therefor, consisting of a removable pivot-pin fastened to the end of the shaft, and a pivot-point of hard-drawn wire set in said pivot-pin axially of the shaft.

3. In a measuring instrument, a shaft, a screw-tip therefor having a gripping-face to facilitate removal, and a hardened point.

4. In a measuring instrument, a shaft, a screw-tip therefor having a portion of its sides flattened to facilitate removal from the shaft, and a hardened point.

5. In an electric meter, a shaft, a removable end piece therefor, and a hard pivot inserted in said end piece in alinement with the axis of the shaft.

6. In combination with the shaft of an electric measuring instrument, an end piece for said shaft consisting of a pivot-pin of non-magnetic material fastened to the end of the shaft but removable therefrom, and a pivot-point of hard steel set in the end of said pivot-pin in alinement with the axis of the shaft.

7. In an electric meter, a shaft, a removable end piece therefor having a gripping-face to facilitate removal, and a hard pivot fastened in said end piece in alinement with the axis of the shaft.

8. In an electric meter, a shaft, a removable end piece therefor having a portion of its sides flattened, and a hard pivot fastened in said end piece in alinement with the axis of the shaft.

9. A bearing for an electric-meter shaft, consisting of a hollow screw, a head therefor independently removable from the body of the screw, a plug carrying a jewel, and a spiral spring supporting the plug, said plug and spring being loosely mounted within the hollow screw.

10. A bearing for an electric-meter shaft, consisting of a hollow screw having a plug carrying a jewel and a spiral spring supporting said plug loosely mounted within said screw, and an end piece for said screw independently removable from the body of the screw to hold the plug and spring in position.

11. In a bearing for a measuring instrument, a carrier and a jewel-support within the carrier having a clearance-space between its side or sides and its carrier.

12. In a bearing for a measuring instrument, a plug, a jewel mounted thereon, a casing or carrier therefor, and means for facilitating removal of the plug from the casing.

13. In a bearing for a measuring instrument, a plug, a jewel mounted thereon, a spring on which the plug rests, a casing or carrier for the plug and spring, and means for facilitating removal of the plug from the casing.

14. In a measuring-instrument bearing, a casing having a partially-closed end, a jewel-support seated in said end, and means for opening the other end of the casing to remove the support.

15. In a measuring-instrument bearing, a casing having a partially-closed end, a jewel-support seated in said end, a spring supporting the jewel-support, and means for opening the other end of the casing to remove the support.

16. A bearing for an electric-meter shaft, comprising a hollow screw, a removable head therefor, and a jewel-plug and a spring supporting the plug loosely mounted within the hollow screw, said plug being formed to provide a clearance between it and the screw.

17. In a bearing for an electric-meter shaft, a jewel-support having flattened sides, and a projection at its end for centering the spring by which the jewel-support is supported.

18. A bearing for an electric-meter shaft, consisting of a plug carrying a jewel, a spiral spring supporting the jewel-plug, and a plug on which the spring rests mounted within a hollow screw having a removable head, said plug and jewel-plug having projections on their adjacent ends for centering the spring.

19. In a measuring-instrument bearing, a jewel-support, a casing therefor, an elastic cushion for said jewel-support, and a spacer formed as a separate piece to permit change of tension.

20. In a measuring-instrument bearing, a jewel-support, a casing therefor, a spacer, and a spring between the jewel-support and spacer.

21. In a measuring-instrument bearing, a jewel-support, a casing therefor, a spacer, a spring between the jewel-support and spacer, said support and spacer having shoulders on which the spring rests.

22. In a measuring-instrument bearing, a jewel-support and a carrier therefor, said jewel-support carrying a jewel in its end and having flattened sides to provide a clearance-space between the same and its carrier.

23. A bearing for a measuring-instrument shaft, comprising a casing, a jewel, a jewel-support, and a spring supporting the jewel-support loosely mounted within the casing, said jewel-support being formed to provide a clearance between it and the casing.

24. In a measuring instrument, the combination of a shaft, a removable end piece for the shaft having a gripping-surface to facilitate removal from the shaft, and a removable jewel-carrier providing when withdrawn an opening to permit detachment and withdrawal of the end piece.

25. The combination with the shaft of an electric meter, of a wire inserted in the tapered end of said shaft parallel to its length bearing on a jewel set in a plug, said plug being supported on a spiral spring and loosely mounted with said spring in a hollow screw having a removable end piece, means for raising or lowering said screw vertically, and means for locking it in any position.

In witness whereof I have hereunto set my hand this 5th day of November, 1902.

GEORGE H. ALTON.

Witnesses:
DUGALD McK. McKILLOP,
HENRY O. WESTENDARP.

DISCLAIMER.

733,611.—*George H. Alton*, Lynn, Mass. BEARING FOR ELECTRIC METERS. Patent dated July 14, 1903. Disclaimer filed March 30, 1905, by the assignee, the *General Electric Company*, a Corporation of New York.

Enters its disclaimer—

"To that part of said Letters Patent which is in the following words, to wit:

"3. In a measuring instrument, a shaft, a screw-tip therefor having a gripping-face to facilitate removal, and a hardened point.

"4. In a measuring instrument, a shaft, a screw-tip therefor having a portion of its sides flattened to facilitate removal from the shaft, and a hardened point.

"11. In a bearing for a measuring instrument, a carrier and a jewel-support within the carrier having a clearance-space between its side or sides and its carrier.

"17. In a bearing for an electric-meter shaft, a jewel-support having flattened sides, and a projection at its end for centering the spring by which the jewel-support is supported.

"22. In a measuring-instrument bearing, a jewel-support and a carrier therefor, said jewel-support carrying a jewel in its end and having flattened sides to provide a clearance-space between the same and its carrier.

"23. A bearing for a measuring-instrument shaft, comprising a casing, a jewel, a jewel-support, and a spring supporting the jewel-support loosely mounted within the casing, said jewel-support being formed to provide a clearance between it and the casing.

"24. In a measuring instrument, the combination of a shaft, a removable end piece for the shaft having a gripping-surface to facilitate removal from the shaft, and a removable jewel-carrier providing when withdrawn an opening to permit detachment and withdrawal of the end piece."—[*Official Gazette, April 4, 1905.*]